US011455374B2

(12) United States Patent
Belbute-Peres et al.

(10) Patent No.: US 11,455,374 B2
(45) Date of Patent: Sep. 27, 2022

(54) SYSTEM AND METHOD FOR COMBINING DIFFERENTIABLE PARTIAL DIFFERENTIAL EQUATION SOLVERS AND GRAPH NEURAL NETWORKS FOR FLUID FLOW PREDICTION

(71) Applicant: Robert Bosch GmbH, Stuttgart (DE)

(72) Inventors: Filipe de Avila Belbute-Peres, Pittsburgh, PA (US); Thomas D. Economon, Pittsburgh, PA (US); Jeremy Kolter, Pittsburgh, PA (US); Devin Willmott, Pittsburgh, PA (US)

(73) Assignee: Robert Bosch GmbH

( * ) Notice: Subject to any disclaimer, the term of this patent is extended or adjusted under 35 U.S.C. 154(b) by 283 days.

(21) Appl. No.: 16/895,766

(22) Filed: Jun. 8, 2020

(65) Prior Publication Data

US 2021/0382963 A1 Dec. 9, 2021

(51) Int. Cl.
*G06F 17/18* (2006.01)
*G06N 3/04* (2006.01)
*G06N 3/08* (2006.01)

(52) U.S. Cl.
CPC ........... *G06F 17/18* (2013.01); *G06N 3/0445* (2013.01); *G06N 3/08* (2013.01)

(58) Field of Classification Search
CPC ......... G06F 17/18; G06N 3/0445; G06N 3/08
See application file for complete search history.

(56) References Cited

U.S. PATENT DOCUMENTS

2016/0350459 A1* 12/2016 Cruz ........................ G06F 30/23
2021/0350620 A1* 11/2021 Bronstein ............... G06F 17/16

OTHER PUBLICATIONS

Economon et al., "SU2: An Open-Source Suite for Multiphysics Simulation and Design", AIAA Journal, vol. 54, No. 3, Mar. 2016, DOI: 10.2514/1.J053813, California, 19 pages.
Bhatnagar et al., "Prediction of Aerodynamic Flow Fields Using Convolutional Neural Networks", arXiv:1905.13166v1 [physics.flu-dyn] May 30, 2019, 30 pages.
Kipf et al., "Semi-Supervised Classification With Graph Convolutional Networks", Published as a conference paper at ICLR 2017, arXiv:1609.02907v4 [cs.LG] Feb. 22, 2017, 14 pages.

* cited by examiner

*Primary Examiner* — Kyle Vallecillo
(74) *Attorney, Agent, or Firm* — Dickinson Wright PLLC

(57) ABSTRACT

A computer-implemented method includes receiving a coarse mesh input that includes a first set of nodes, wherein the coarse mesh is input to a computational fluid dynamics solver with physical parameters to obtain a coarse mesh solution, receiving a fine mesh input that is of a second set of nodes, wherein the second set of nodes includes more nodes than the first set of nodes, concatenating the fine mesh input with the physical parameters and run the concatenation through a graph convolution layer to obtain a fine mesh hidden layer, upsampling the coarse mesh solution to obtain a coarse mesh upsample including a same number of nodes as the second set of nodes, and outputting a prediction in response to at least the coarse mesh upsample.

20 Claims, 4 Drawing Sheets

SYSTEM AND METHOD FOR COMBINING DIFFERENTIABLE PARTIAL DIFFERENTIAL EQUATION SOLVERS AND GRAPH NEURAL NETWORKS FOR FLUID FLOW PREDICTION

TECHNICAL FIELD

The present disclosure relates to systems that utilize computational fluid dynamics (CFD) and CFD solvers.

BACKGROUND

Solving large complex partial differential equations (PDEs), such as those that arise in computational fluid dynamics (CFD), is a computationally expensive process. This has motivated the use of deep learning approaches to approximate the PDE solutions, yet the simulation results predicted from these approaches typically do not generalize well to new scenarios.

SUMMARY

According to one embodiment, a system that includes a processor programmed to receive a coarse mesh input that includes a first set of nodes, wherein the coarse mesh is input to a computational fluid dynamics solver with physical parameters to obtain a coarse mesh solution, receive a fine mesh input that is of a second set of nodes, wherein the second set of nodes includes more nodes than the first set of nodes, concatenate the fine mesh input with the physical parameters and run the concatenation through a graph convolution layer to obtain a fine mesh hidden layer, upsample the coarse mesh solution to obtain a coarse mesh upsample including a same number of nodes as the second set of nodes, concatenate the fine mesh hidden layer with the coarse mesh upsample, and output a prediction in response to the concatenation of the fine mesh hidden layer and the coarse mesh upsample.

According to a second embodiment, a computer-implemented method includes receiving a coarse mesh input that includes a first set of nodes, wherein the coarse mesh is input to a computational fluid dynamics solver with physical parameters to obtain a coarse mesh solution, receiving a fine mesh input that is of a second set of nodes, wherein the second set of nodes includes more nodes than the first set of nodes, concatenating the fine mesh input with the physical parameters and run the concatenation through a graph convolution layer to obtain a fine mesh hidden layer, upsampling the coarse mesh solution to obtain a coarse mesh upsample including a same number of nodes as the second set of nodes, and outputting a prediction in response to at least the coarse mesh upsample.

According to a third embodiment, a system includes, a processor programmed to receive a coarse mesh input that includes a first set of nodes, wherein the coarse mesh is input to a computational fluid dynamics solver with physical parameters to obtain a coarse mesh solution, receive a fine mesh input that is of a second set of nodes, wherein the second set of nodes includes more nodes than the first set of nodes, upsample the coarse mesh solution to obtain a coarse mesh upsample including a same number of nodes as the second set of nodes, and output a prediction in response to the fine mesh input and the coarse mesh upsample.

DETAILED DESCRIPTION

Figure 1:
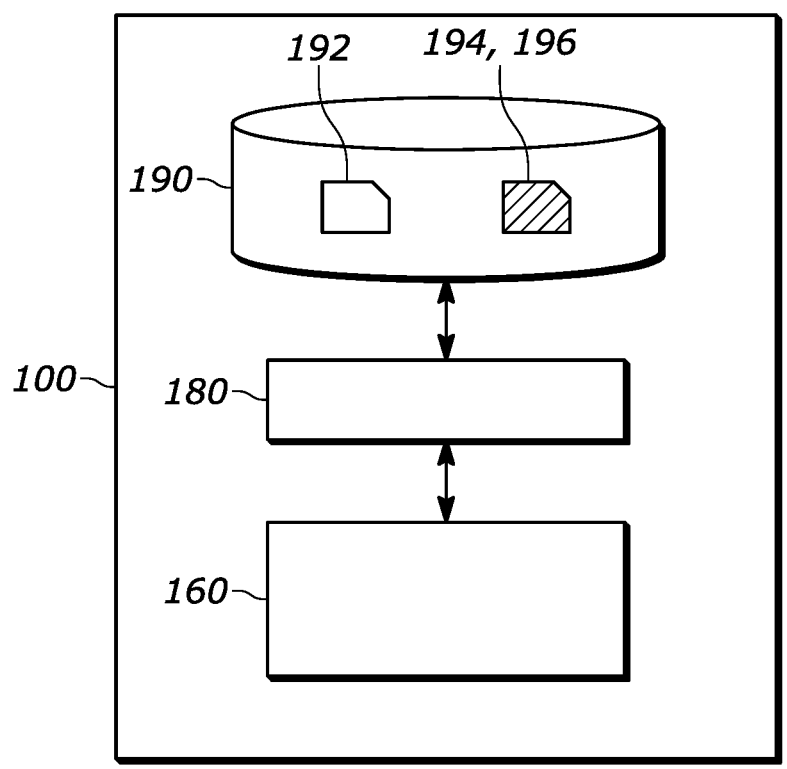
FIG. 1 discloses a system 100 for training a neural network.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The disclosure discusses a hybrid (graph) neural network that combines a traditional graph convolutional network with an embedded differentiable fluid dynamics simulator inside the network itself. By combining an actual CFD simulator (run on a much coarser resolution representation of the problem) with the graph network, we show that we can both generalize well to new situations and benefit from the substantial speedup of neural network CFD predictions, while also substantially outperforming the coarse CFD simulation alone.

A hybrid approach that combines the benefits of (graph) neural networks for fast predictions, with the physical realism of an industry-grade CFD simulator is disclosed below. The system may include a graph convolution network (GCN), which operates directly upon the non-uniform mesh used in typical CFD simulation tasks. The use of GCNs may be important because all realistic CFD solvers operate on these unstructured meshes rather than directly on the regular grid, which may be typically used on convolutional networks to approximate CFD simulations. Second, the system may embed a (differentiable) CFD solver, operating on a much coarser resolution, directly into the GCN itself. Although typically treated as black boxes, modern CFD simulators are themselves may be utilized as (costly) "layers" in a deep network. Using well-studied adjoint methods, modern solvers can compute gradients of the output quantities of a simulation with respect to the input mesh. This allows the system to integrate a fast CFD simulation (made fast because it is operating on a much smaller mesh) into the network itself, and allows us to jointly train the GCN and the mesh input into the simulation engine, all in an end-to-end fashion. The combined approach may perform substantially better than the coarse CFD simulation alone (for example, the network may be able to provide higher fidelity results than simply running a faster simulation to begin with), and generalizes to novel situations much better than a pure graph network-based approach. The approach may be substantially faster than running the CFD simulation on the original size mesh itself. As compared to a CFD solver used without deep learning, the disclosure of the various embodiments shown below perform simulations more accurately, and faster because the CFD solver is operating on a coarser mesh. Relative to deep learning approaches that do not incorporate CFD solvers, this method is also more capable of generalizing to new situations.

FIG. 1 shows a system 100 for training a neural network. The system 100 may comprise an input interface for accessing training data 192 for the neural network. For example, as illustrated in FIG. 1, the input interface may be constituted by a data storage interface 180 which may access the training data 192 from a data storage 190. For example, the data storage interface 180 may be a memory interface or a persistent storage interface, 30 e.g., a hard disk or an SSD interface, but also a personal, local or wide area network interface such as a Bluetooth, Zigbee or Wi-Fi interface or an ethernet or fiberoptic interface. The data storage 190 may be an internal data storage of the system 100, such as a hard drive or SSD, but also an external data storage, e.g., a network-accessible data storage.

In some embodiments, the data storage 190 may further comprise a data representation 194 of an untrained version of the neural network which may be accessed by the system 100 from the data storage 190. It will be appreciated, however, that the training data 192 and the data representation 194 of the untrained neural network may also each be accessed from a different data storage, e.g., via a different subsystem of the data storage 5 interface 180. Each subsystem may be of a type as is described above for the data storage interface 180. In other embodiments, the data representation 194 of the untrained neural network may be internally generated by the system 100 on the basis of design parameters for the neural network, and therefore may not explicitly be stored on the data storage 190. The system 100 may further comprise a processor subsystem 160 which may be configured to, during operation of the system 100, provide an iterative function as a substitute for a stack of layers of the neural network to be trained. Here, respective layers of the stack of layers being substituted may have mutually shared weights and may receive as input an output of a previous layer, or for a first layer of the stack of layers, an initial activation, and a part of the input of the stack of layers. The processor subsystem 160 may be further configured to iteratively train the neural network using the training data 192. Here, an iteration of the training by the processor subsystem 160 may comprise a forward propagation part and a backward propagation part. The processor subsystem 160 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 196 of the trained neural network, this data may also be referred to as trained model data 196. For example, as also illustrated in FIG. 1, the output interface may be constituted by the data storage interface 180, with said interface being in these embodiments an input/output ('IO') interface, via which the trained model data 196 may be stored in the data storage 190. For example, the data representation 194 defining the 'untrained' neural network may during or after the training be replaced, at least in part by the data representation 196 of the trained neural network, in that the parameters of the neural network, such as weights, hyperparameters and other types of parameters of neural networks, may be adapted to reflect the training on the training data 192. This is also illustrated in FIG. 1 by the reference numerals 194, 196 referring to the same data record on the data storage 190. In other embodiments, the data representation 196 may be stored separately from the data representation 194 defining the 'untrained' neural network. In some embodiments, the output interface may be separate from the data storage interface 180, but may in general be of a type as described above for the data storage interface 180.

Figure 2:
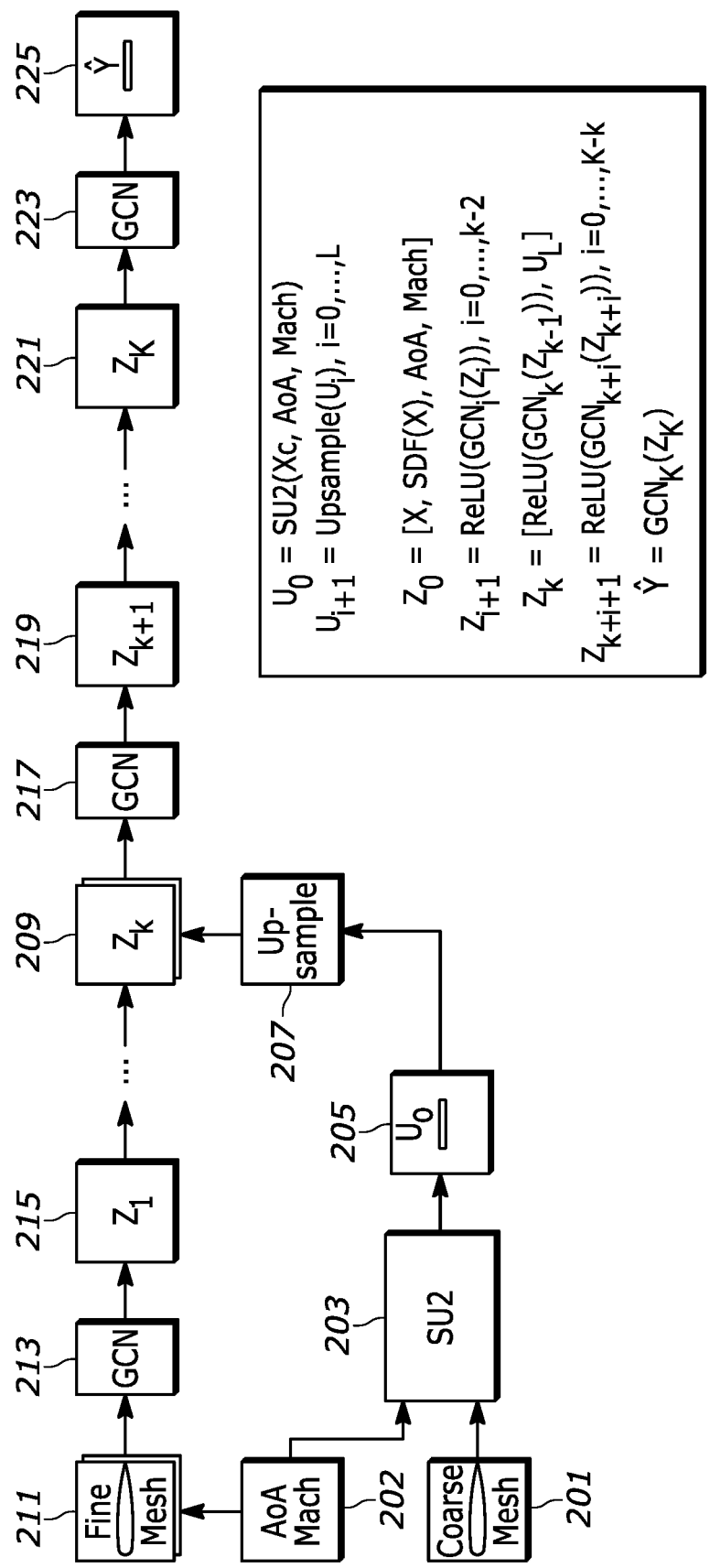
FIG. 2 discloses a computer-implemented method 200 for training a neural network.

FIG. 2 is an example of a diagram of the CFD_GCN model. The network operates over two different graphs, a "fine" mesh 211 over which to compute the CFD simulation, and a "coarse" mesh 201 (initially a simple coarsened version of the fine mesh, but eventually tuned by the model) that acts as input to the CFD solver 203. As input, the network takes a small number of parameters that govern the simulation. For the case of the experiments in the embodiments described below, in which the system may predict the flow fields around an airfoil, these parameters 202 may include the Angle of Attack (AoA) and the Mach number. These parameters 202 may be provided to the CFD simulation and may also appended to the initial GCN node 213 features. Although it may appear to be a relatively low-dimensional task, these two components can vary the output of the simulation drastically and are difficult for traditional models to learn when generalizing outside the precise range of values used to "train" the network. Additionally, the CFD-GCN model may be used in an application that utilizes temperature and angle of attack or other design parameters to determine fluid flow and turbulence through pipes, or an application that utilizes geometric or shape optimization parameters to determine noise or turbulence generated by blades of a fan or other moving parts of an object. This may include, but not be limited to, applications utilized in heat sink applications, fan blade circulation, propeller, circulation, etc.

The network may operate by first running a CFD simulation on the coarse mesh input 201, while simultaneously processing the graph defined by the fine mesh 211 with one or more GCNs 213. The system may then upsample 207 the results of the simulation, and concatenates these with an intermediate output 215 from a GCN at step 209. In yet another alterative embodiment, the system may combine the not-upsampled coarse mesh solution $U_0$ and the fine mesh by just taking all of the nodes from each and forming a mesh from that, so that the number of nodes in the resulting mesh is (# of coarse mesh nodes)+(# of fine mesh nodes).

Finally, the system may apply additional GCN layers 217, 213 to these joint features, ultimately predicting the desired output values 225 (in this embodiment, it may be the velocity and pressure fields at each node in the fine mesh 211). For example, the fine mesh 211 may include 6600 nodes, while a coarse mesh 201 may include 550 nodes for the same airfoil or same set of parameters. The fine mesh 211 may include 1.5 times, 2 times, 3 times, 4 times, 5 times, 10 times, etc. the nodes greater than the coarse mesh 201. Both of the meshes may be mixed triangular or quadrilateral meshes in the various embodiments.

The graph structure may use for the CFD-GCN may be directly derived from the mesh structure used by traditional CFD software to simulate the physical system. The system may consider a two dimensional, triangular mesh M (X;E;

B). The first element, $X_i \in \mathbb{R}^{N \times 2}$, may be a matrix containing the (x, y) coordinates of the N nodes that compose the mesh. The second, $$E\{(i_1;j_1;k_1), \ldots ,(i_m;j_m;k_m)\},$$

may be a set of M triangular elements defined by the indices (i; j; k) of their component nodes. The third, $$B\{(i_1;b_1), \ldots ,(i_L;b_L)\},$$

may be a set of L boundary points, defined as a pair consisting of the index of the node and a tag b that identifies which boundary the point belongs to (e.g. airfoil, farfield, etc.). Such a mesh M clearly defines a graph $G_M=(X;E_G)$ whose nodes are the same X, and whose edges $E_G$ can be directly inferred from the mesh elements E. Conversely, a graph can also be converted into a mesh if the structure of its edges is appropriate and a set of boundary points B is provided.

In addition to the fine mesh 211 used to compute the CFD simulation, the system may also consider a coarse mesh 201, denoted Mc. The coarse mesh 201 has the same structure as the fine mesh M, with the number of nodes down sampled by over 10× (or any other value), which thus allows for much faster simulation. Although this mesh also technically defines a graph, the system may not directly compute any GCN over this graph, but instead only use it as input to the simulation engine.

In addition to the graphs themselves, the model also receives as input two physical parameters 202 that define the behavior of the flow around an airfoil: the angle of attack (AoA) and the Mach number. These two parameters are both fed into the simulation and appended as initial node features for every node in the GCN. These two parameters, or any other parameters for other applications, may be the quantities that vary from simulation-to-simulation, and thus the main task of the GCN is to learn how to predict the resulting flow field from these two parameters that define the simulation.

A central component of the CFD-CGN model may be the integrated differentiable fluid simulator 203. As input, the fluid simulator 203 may take coarse mesh 201 $M_C$, plus the angle of attack and Mach number, and outputs predictions 205 of the velocity and pressure at each node in the coarse graph. The system may employ the SU2 fluid simulator 203 (in one example), which is an open source, industry-grade CFD simulation widely used by many researchers in aerospace and beyond. Briefly, SU2 uses a finite volume method (FVM) to solve the Navier-Stokes equations over its input mesh. Crucially for our purposes, the SU2 solver also support an adjoint method which lets the system differentiate the outputs of the simulation with respect to its inputs and parameters (in this case, the coarse mesh 201 $M_C$ itself, plus the angle of attack and Mach number).

Intuitively, the CFD solver 203 (e.g., SU2 solver) should be thought of as an additional layer in our network, which takes the angle of attack and Mach number as input, and produces the output velocity and pressure fields at the solver output 205. The equivalent of the "parameters" of a traditional layer is the coarse mesh itself: different configurations for the coarse mesh will be differently suited to integration within the remainder of the CFD-GCN. Thus, one of the main learning tasks for the SU2 portion of our model is to adjust the coarse mesh in a manner than eventually maximizes accuracy of the resulting full CFD-GCN model. The adjoint method in SU2 uses reverse-mode differentiation, so gradients can be efficiently computed with respect to a scalar-valued loss such as the overall predictive error of the CFD-GCN.

Finally, although not strictly a research contribution, that as part of this project we have developed an interface layer between the SU2 solver 203 and the PyTorch library. This interface allows full SU2 simulations to be treated just as any other layer within a PyTorch module, and we hope it will find additional applications at the intersection of deep learning and (industrial-grade) CFD simulation.

The output of the coarse simulation described above is a mesh with the predicted values for each field at every node. For this to be used towards generating the final prediction, the system may need to up sample it to the size of the fine mesh. The system may accomplish this by performing successive applications of squared distance-weighted, k-nearest neighbors interpolation. The node positions in the coarse mesh may refer to the following symbols utilized interchangeably,

| First Symbol | Alternative Symbol | Meaning |
| --- | --- | --- |
| $X_C$ | $X_D$ | Node positions in the coarse mesh |
| $U_C$ | D | Node features in the coarse mesh |
| $X_F$ | $X_U$ | Node positions in the fine mesh |
| $U_F$ | U | Node features in the fine mesh |

Let us call the first element, $X_i \in \mathbb{R}^{NU \times 3}$ the up sampled version of some coarser graph $D \in \mathbb{R}^{ND \times 3}$. For every row $U^{(i)}$, with corresponding node position in the fine mesh, the system may find the set $\{n_1, \ldots, n_k\}$ containing the indices of the k closes nodes to the corresponding node positions in the coarser graph $X_D$. The system may define each node feature in the fine mesh $U^{(i)}$. Thus, given a coarse mesh with positions $X_C$ and features $U_C$, and fine mesh positions $X_F$, this operation produces fine mesh features $U_F$. This is done using a k-nearest neighbors' operation. Denote the node with index i in the fine mesh as $X_F^{(i)}$, and let $\{n_1, \ldots, n_k\}$ be the k nodes (default may be 3 nodes, k=3) in the coarse mesh $X_C$ closest to $X_F^{(i)}$. Then the features for node i in the fine mesh are given by $$U_F^{(i)} = \frac{\sum_{j=1}^{k} w(n_j) U_C^{n_j}}{\sum_{j=1}^{k} w(fn_j)}$$

where $$w(n_j) = \frac{1}{\left\| X_F^{(i)} - X_C^{n_j} \right\|_2^2}$$

As depicted in FIG. 2, the output of the coarse simulation is processed by a sequence of convolutional layers. In order to operate directly on the mesh output of the CFD simulation, the system may utilize the graph convolution network (GCN) architecture. The architecture may define a convolutional layer for graphs.

A general graph consisting of $N_z$ nodes, each with F features, is defined by its feature matrix $Z_i \in \mathbb{R}^{N_z \times F}$ and its adjacency matrix $A \in \mathbb{R}^{N_z \times N_z}$. We can then further define $\tilde{B} = \tilde{D}^{-1/2}(A+I)\tilde{D}^{-1/2}$, where I is the identity matrix and $\tilde{D}$ the diagonal degree matrix, with its diagonal given by $\tilde{D}_{ii} = 1+$ $\sum_{j=0}^{N_z} A_{ij}$. Then, a GCN layer 217 with F input channels and F' output channels, parametrized by the weight matrix $W \in \mathbb{R}^{F \times F'}$ and the bias term $b \in \mathbb{R}^{N_z \times F'}$, will have as output $$Z_{i+1} = \tilde{B} Z_i W_i + b_i \equiv GCN_i(Z_i).$$

With all of the components acting together, the system can run an SU2 simulation with the coarse mesh 201 and the physical parameters 202. The output 205 of this coarse simulation is upsampled L times.

$$U_0 = SU2(X_C, AoA, Mach)$$

$$U_{i+1} = \text{Upsample}(U_i), i=0, \ldots, L$$

Concurrently, the fine mesh 211 has the physical parameters and the signed distance function (SDF) appended to each of its nodes' features. Here, the SDF at a node may be defined as its Euclidean distance to the closest node at the airfoil boundary. The resulting graph is then passed through a series of graph convolutions 213, as shown by graph convolutions 213, 219, 221, 223. At some specified convolutional layer k, the final upsampled value $U_L$ is appended to the output $Z_k$ 221 of the k-th convolution. Another set of convolutions 223 is performed in order to generate the final prediction $\hat{Y}$ 225. Each of these steps are outlined in the formulas below:

$$Z_0 = [X, SDF(X), AoA, Mach]$$

$$Z_{i+1} = ReLU(GCN_i(Z_i)), i=0, \ldots, k-2$$

$$Z_k = [ReLU(GCN_k(Z_{k-1})), U_L]$$

$$Z_{k+i+1} = ReLU(GCN_{k+i}(Z_i)), i=0, \ldots, K-k$$

$$\hat{Y} = GCN_K(Z_K)$$

In such an example, [·,·] may be the matrix concatenation operation over the column dimension.

Given that the entire CFD-GCN as formulated above can be treated as a single differentiable deep network (including the SU2 "layer" or CFD Solver "layer"), the training process itself may be straight forward. The model is trained to predict the output fields $\hat{Y} \in \mathbb{R}^{N \times 3}$, consisting of the x and y components of the velocity and the pressure at each node in the fine mesh, by minimizing the mean squared error (MSE) loss $\ell$ (or any other type of loss function that compares ground truth to the network output) between the prediction $\hat{Y}$ and ground truth $$\ell(Y, \hat{Y}) = \frac{1}{3N} \|Y - \hat{Y}\|_2^2$$

where the ground truth Y in this case is obtained by running the full SU2 solver to convergence on the original fine mesh. The training procedure optimizes the weight matrices $W_i$ and $b_i$ of the GCNs, and the positions of the nodes in the coarse mesh $X_C$ by backpropagating through the CFD simulation. The loss may be minimized using an Adam optimizer (or any other optimizer) with a learning rate $\alpha = 5 \cdot 10^{-5}$.

The system may also run a backward pass sequence to improve the system over time. To summarize, the system may obtain loss L by comparing prediction $\hat{Y}$ with ground truth Y (using mean squared error, or any other loss function). The backward pass function or backward pass sequence may utilize various steps. The system may utilize the following sequences (in no specific order):

a. Gradients $$\frac{\partial L}{\partial \theta_i}$$

of loss with respect to graph convolution layer parameters for $i=1, \ldots, K$ b. Gradient $$\frac{\partial L}{\partial U_0}$$

of loss with respect to solver output c. Using $$\frac{\partial L}{\partial U_0}$$

and adjoint methods to compute gradients $$\frac{\partial L}{\partial X_C}$$

Thus, the system may use gradients and some deep learning optimization algorithm (stochastic gradient descent, ADAM, etc.) to update parameters $\theta_i$ and coarse mesh positions $X_C$.

The network may use the ability to differentiate through the solver function to learn the best positions of nodes in the coarse mesh $X_C$. The system could place convolutional layers before the CFD solver, and could also learn parameters in those layers through the same method. The algorithm may also include a single up sampling operation (e.g., $U_1 = \text{Upsample}(X_C, U_0, X_F)$) to expand the coarse mesh to match the size of the fine mesh; however, an alternative may also break the sample into multiple up sampling operations if desired. This may be beneficial if the coarse mesh is far smaller than the fine mesh.

In an alternative embodiment, graph convolutions may be replaced with any type of neural network layer that operates on graphs (e.g., graph self-attention layers, graph transformers), or may be replaced with convolutional layers if the mesh is in a grid. The system may change the loss function, optimizer, or activation function. The network architecture may be compatible with standard deep learning training techniques or modifications (dropout, batch normalization, layer normalization, etc). In yet another alterative embodiment, the system may combine the not-upsampled coarse mesh solution $U_0$ and the fine mesh by taking all of the nodes from each and forming a mesh from that, so that the number of nodes in the resulting mesh is (# of coarse mesh nodes)+(# of fine mesh nodes).

Figure 3:
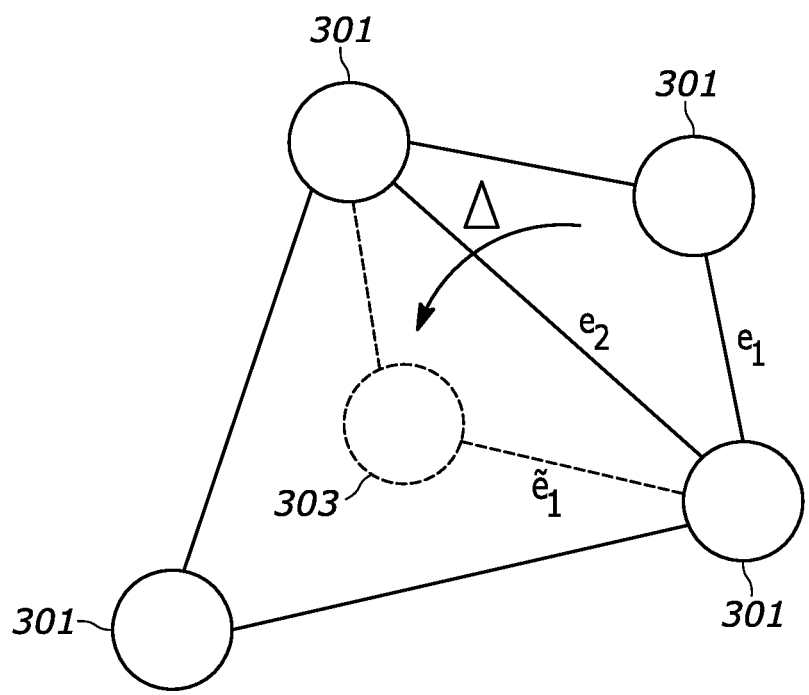
FIG. 3 discloses an example of a mesh.

FIG. 3 illustrates an example of a mesh. An issue may arise when optimizing the input coarse mesh. Gradually, as the node positions are moved by the gradient descent updates, it is possible that in a given triangular element, one of the nodes (e.g., node 301) may cross over an edge as shown by cross-over node 303. This may generate non-physical volumes, which may harm the stability of the simulations, frequently impeding convergence. In other words, at each gradient update step, the optimizer may update the mesh nodes 301 by performing the update $$X_c \leftarrow X_c + \Delta X_c,$$

with some small update matrix $\Delta X_c$ of the same shape as $X_c$. If left unmodified, this $\Delta X_c$ can cause the above mentioned issued. Thus, a node might be pushed over the edge of its triangular element, generating overlap of elements. Such non-physical situations may harm convergence of the simulation. When this occurs, the cross product between ordered edges changes. Before the updated, $e_1 \times e_0 > 0$, while afterwards $\hat{e}_1 \times e_2 < 0$.

In order to avoid non-physical volumes, the system may generate a projected update $P(\Delta X_c)$ such that only non-degenerating updates are performed. The system may start with $P(\Delta X_c) = \Delta X_c$. Then, the system may check which elements in the mesh may have a node pushed over an edge by $\Delta X_c$. This may be done by computing the cross product of two edges in each triangular element in a consistent order. If the sign of the cross product flips with the update $X_v + \Delta X_c$.

That means a node crossed over an edge since it causes the ordering of the nodes to change. This may be depicted in FIG. 3, where the cross product of the edges $e_1$ and $e_2$ is positive before the update, but negative afterwards.

For every element E (i, j, k) which has flipped, the system may set rows i, j, and k, of $P(\Delta X_c)$ to 0, thus performing no updates to those points in $X_c$. Since removing the updates to some nodes might cause new elements to flip, this procedure may be repeated until no points are flipped. Once the system reaches this sate, the system may perform the projected gradient update $$X_c \leftarrow X_c + P(\Delta X_c),$$

Figure 4:
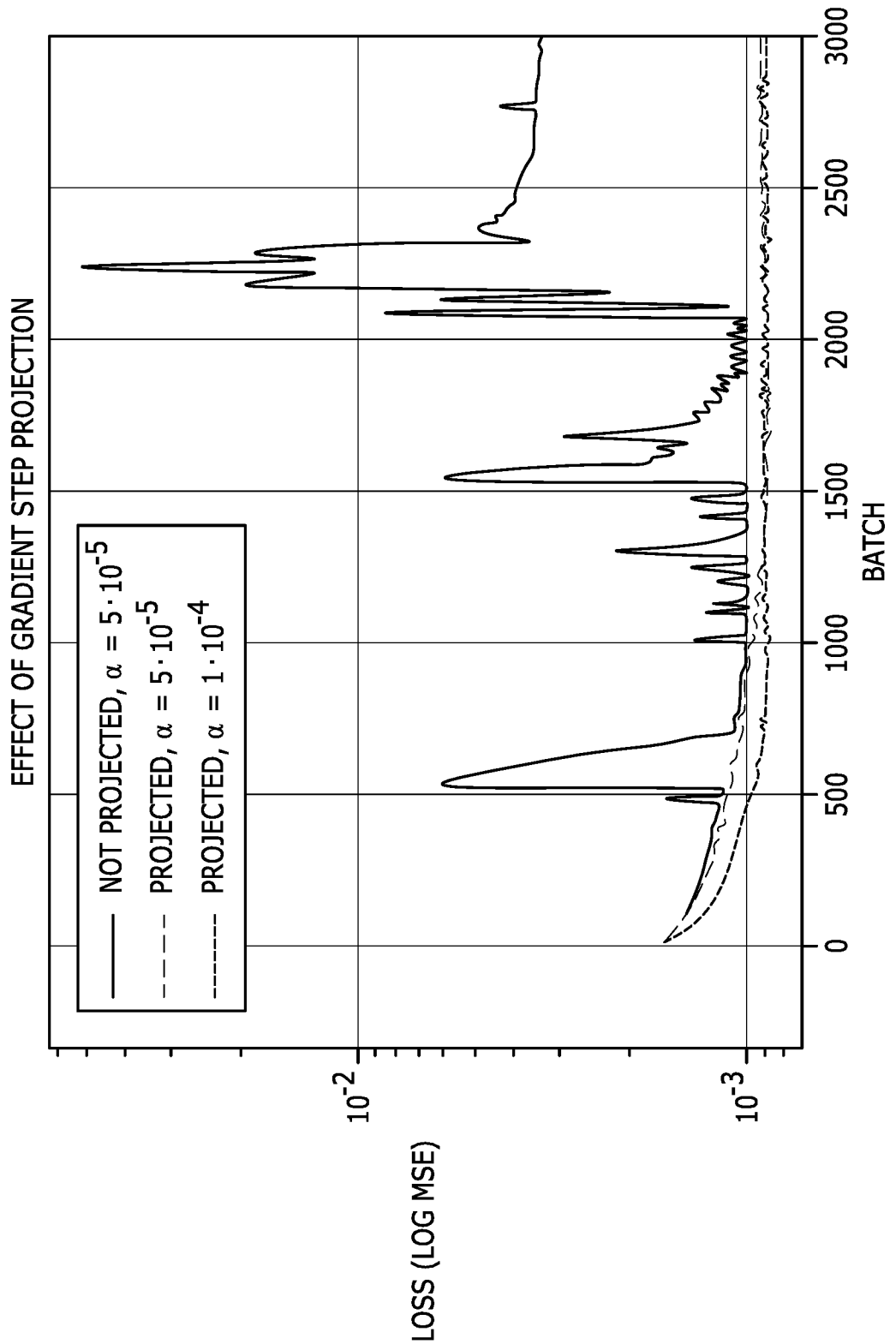
FIG. 4 shows an example graph of the results of optimizing the nodes.

FIG. 4 shows an example graph of the results of optimizing the nodes. The optimizing of the nodes of a mesh to improve a prediction loss both with and without the correct of the gradient update. Whereas the mesh optimized without the correction quickly degenerates and the loss diverges, the one with the projected gradient update learns smoothly, even for a higher learning rate $\alpha$.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system, comprising:
a processor programmed to:
receive a coarse mesh input that includes a first set of nodes, wherein the coarse mesh input is input to a computational fluid dynamics (CFD) solver with physical parameters to obtain a coarse mesh solution;
receive a fine mesh input that is of a second set of nodes, wherein the second set of nodes includes more nodes than the first set of nodes;
concatenate the fine mesh input with the physical parameters and run the concatenation through a graph convolution layer to obtain a fine mesh hidden layer;
upsample the coarse mesh solution to obtain a coarse mesh upsample including a same number of nodes as the second set of nodes;
concatenate the fine mesh hidden layer with the coarse mesh upsample;
output a prediction in response to the concatenation of the fine mesh hidden layer and the coarse mesh upsample.

2. The system of claim 1, wherein the CFD solver is a layer of a neural network.

3. The system of claim 1, wherein the coarse mesh input and the fine mesh input are both mixed triangular meshes, or quadrilateral meshes.

4. The system of claim 1, wherein the coarse mesh input and the fine mesh input are both quadrilateral meshes.

5. The system of claim 1, wherein the coarse mesh input is converted to a triangular mesh by dividing every quadrilateral element in half along a diagonal.

6. The system of claim 1, wherein the fine mesh input is input to a graph convolutional network layer prior to concatenation with the coarse mesh solution.

7. The system of claim 1, wherein the physical parameters include both an angle of attack and a Mach number.

8. The system of claim 1, wherein the coarse mesh input that includes the first set of nodes.

9. The system of claim 1, wherein the processor is further programmed to compare the prediction to a ground truth in a backward pass sequence.

10. The system of claim 1, wherein the coarse mesh solution is includes pressure for each node.

11. A computer-implemented method, comprising:
receiving a coarse mesh input that includes a first set of nodes, wherein the coarse mesh input is input to a computational fluid dynamics solver with physical parameters to obtain a coarse mesh solution;
receiving a fine mesh input that is of a second set of nodes, wherein the second set of nodes includes more nodes than the first set of nodes;
concatenating the fine mesh input with the physical parameters and run the concatenation through a graph convolution layer to obtain a fine mesh hidden layer;

upsampling the coarse mesh solution to obtain a coarse mesh upsample including a same number of nodes as the second set of nodes; and outputting a prediction in response to at least the coarse mesh upsample.

12. The computer-implemented method of claim 11, wherein the second set of nodes includes two times more nodes than the first set of nodes.

13. The computer-implemented method of claim 11, wherein the physical parameters include either an angle of attack or a Mach number.

14. The computer-implemented method of claim 11, concatenating the fine mesh hidden layer with the coarse mesh upsample.

15. The computer-implemented method of claim 11, wherein the second set of nodes includes ten times more nodes than the first set of nodes.

16. The computer-implemented method of claim 11, wherein upsampling the coarse mesh solution to obtain a coarse mesh upsample including a same number of nodes as the second set of nodes plus the first set of nodes.

17. A system, comprising:
a processor programmed to:
receive a coarse mesh input that includes a first set of nodes, wherein the coarse mesh input is input to a computational fluid dynamics solver with physical parameters to obtain a coarse mesh solution;
receive a fine mesh input that is of a second set of nodes, wherein the second set of nodes includes more nodes than the first set of nodes;
upsample the coarse mesh solution to obtain a coarse mesh upsample including a same number of nodes as the second set of nodes;
output a prediction in response to the fine mesh input and the coarse mesh upsample.

18. The system of claim 17, wherein the processor is further programmed to concatenate the fine mesh input with the physical parameters and run the concatenation through a graph convolution layer to obtain a fine mesh hidden layer.

19. The system of claim 18, wherein the processor is further programmed to concatenate the coarse mesh upsample with a fine mesh hidden layer that includes at least the fine mesh input.

20. The system of claim 19, output a prediction in response to the concatenation of the fine mesh hidden layer and the coarse mesh upsample.

\* \* \* \* \*